US012151618B2

(12) United States Patent
Fujiwara et al.

(10) Patent No.: US 12,151,618 B2
(45) Date of Patent: Nov. 26, 2024

(54) CONTROL DEVICE, CONTROL METHOD, AND STORAGE MEDIUM

(71) Applicant: HONDA MOTOR CO., LTD., Tokyo (JP)

(72) Inventors: Tatsuro Fujiwara, Tokyo (JP); Yasushi Shoda, Tokyo (JP); Jumpei Morita, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 93 days.

(21) Appl. No.: 17/991,201

(22) Filed: Nov. 21, 2022

(65) Prior Publication Data

US 2023/0158956 A1 May 25, 2023

(30) Foreign Application Priority Data

Nov. 24, 2021 (JP) ................................ 2021-190067

(51) Int. Cl.
*B60R 1/22* (2022.01)
*G06T 15/20* (2011.01)
*H04N 5/262* (2006.01)

(52) U.S. Cl.
CPC .............. *B60R 1/22* (2022.01); *G06T 15/205* (2013.01); *H04N 5/2628* (2013.01); *B60R 2300/105* (2013.01); *B60R 2300/607* (2013.01)

(58) Field of Classification Search
CPC ...................................................... G06T 15/20
See application file for complete search history.

(56) References Cited

U.S. PATENT DOCUMENTS

2010/0066833 A1* 3/2010 Ohshima ................. B60R 1/074 348/148
2014/0152827 A1* 6/2014 Yamamoto ................ B60R 1/27 348/148

FOREIGN PATENT DOCUMENTS

JP 5112998 B2 1/2013
JP 2013-093865 A 5/2013

* cited by examiner

*Primary Examiner* — Shivang I Patel
(74) *Attorney, Agent, or Firm* — Paratus Law Group, PLLC

(57) ABSTRACT

A control device includes circuitry configured to: generate a bird's-eye view image and a three-dimensional image that show a moving body and surroundings of the moving body, based on respective pieces of imaging data obtained by a plurality of imaging devices of the moving body; cause a display device to display the generated bird's-eye view image and the generated three-dimensional image; and determine whether a predetermined object is present in a boundary region between the respective pieces of imaging data in the bird's-eye view image and the three-dimensional image. Upon determining that the predetermined object is present in the boundary region, the circuitry is configured to preferentially change the boundary region in the three-dimensional image among the displayed bird's-eye view image and the displayed three-dimensional image.

6 Claims, 12 Drawing Sheets

CONTROL DEVICE, CONTROL METHOD, AND STORAGE MEDIUM

CROSS-REFERENCE TO RELATED APPLICATIONS

This application is based on and claims priority under 35 USC 119 from Japanese Patent Application No. 2021-190067 filed on Nov. 24, 2021, the contents of which are incorporated herein by reference.

TECHNICAL FIELD

The present disclosure relates to a control device, a control method, and a storage medium storing a control program.

BACKGROUND ART

In recent years, as a specific measure against global climate change, efforts for implementing a low-carbon society or a decarbonized society have become active. Also in vehicles, reduction in $CO_2$ emission is strongly required, and automatic driving of vehicles and introduction of driving assistance that contribute to improvement in fuel efficiency are rapidly progressing.

In the related art, an image generation method has been known in which a predetermined range is imaged by each of cameras mounted on front, rear, left, and right sides of a vehicle, a surroundings image (for example, a bird's-eye view image) of the vehicle and the surroundings of the vehicle is generated based on a combined image of the captured images, and a three-dimensional image is generated based on the bird's-eye view image. Japanese Patent Publication No. 5112998 (hereinafter, referred to as Patent Literature 1) discloses a vehicle surroundings monitoring device that changes an imaging range of each camera in accordance with opening and closing of a side mirror of a vehicle, and that changes a boundary position between captured images in a combined image of the captured images to generate a bird's-eye view image. Further, Japanese Patent Application Laid-Open Publication No. 2013-093865 (hereinafter, referred to as Patent Literature 2) discloses a vehicle surroundings monitoring device in which a boundary line on a generated bird's-eye view image is changed with respect to a target whose entirety is not displayed on the generated bird's-eye view image, and the entirety of the target is displayed.

For example, a bird's-eye view image or a three-dimensional image may be displayed on a display device of a vehicle at the time of parking assistance of the vehicle. At this time, boundary lines between captured images in the bird's-eye view image or the three-dimensional image may be displayed overlapping a parking frame the vehicle is to be parked in or a parking frame the vehicle is in the process of being parked in. In this case, an image of the parking frame in which the boundary lines are displayed overlapping the parking frame becomes a distorted image, has a lowered visibility, and thus is not desirable as an image at the time of parking.

However, Patent Literature 1 and Patent Literature 2 do not describe a correspondence relationship between a parking frame and a boundary line between captured images at the time of parking assistance. Therefore, there is room for improvement in the visibility of the bird's-eye view image and the three-dimensional image at the time of parking assistance.

An object of the present disclosure is to provide a control device, a control method, and a storage medium storing a control program capable of displaying a surroundings image of a moving body that enables quick recognizing of a predetermined object.

SUMMARY

A first aspect of the present disclosure relates to a control device, including:

circuitry configured to:

generate a bird's-eye view image and a three-dimensional image that show a moving body and surroundings of the moving body, based on respective pieces of imaging data obtained by a plurality of imaging devices of the moving body;

cause a display device to display the generated bird's-eye view image and the generated three-dimensional image; and determine whether a predetermined object is present in a boundary region between the respective pieces of imaging data in the bird's-eye view image and the three-dimensional image, in which upon determining that the predetermined object is present in the boundary region, the circuitry is configured to preferentially change the boundary region in the three-dimensional image among the displayed bird's-eye view image and the displayed three-dimensional image.

A second aspect of the present disclosure relates to a control method executed by a processor, in which the processor is configured to generate a bird's-eye view image and a three-dimensional image that show a moving body and surroundings of the moving body based on respective pieces of imaging data obtained by a plurality of imaging devices of the moving body, and display the generated bird's-eye view image and the generated three-dimensional image on a display device, and the control method includes:

the processor determining whether a predetermined object is present in a boundary region between the respective pieces of imaging data in the bird's-eye view image and the three-dimensional image; and upon determining that the predetermined object is present in the boundary region, the processor preferentially changing the boundary region in the three-dimensional image among the displayed bird's-eye view image and the displayed three-dimensional image A third aspect of the present disclosure relates to a non-transitory computer-readable storage medium storing a control program for causing a processor to perform processing, in which the processor is configured to generate a bird's-eye view image and a three-dimensional image that show a moving body and surroundings of the moving body based on respective pieces of imaging data obtained by a plurality of imaging devices of the moving body, and to display the generated bird's-eye view image and the generated three-dimensional image on a display device, and the processing includes;

determining whether a predetermined object is present in a boundary region between the respective pieces of imaging data in the bird's-eye view image and the three-dimensional image; and when it is determined that the predetermined object is present in the boundary region, preferentially changing the boundary region in the three-dimensional image among the displayed bird's-eye view image and the displayed three-dimensional image.

According to the control device, the control method, and the control program of the present disclosure, it is possible to display surrounding images of a moving body that enables quick recognizing of a predetermined object.

DESCRIPTION OF EMBODIMENTS

Figure 1:
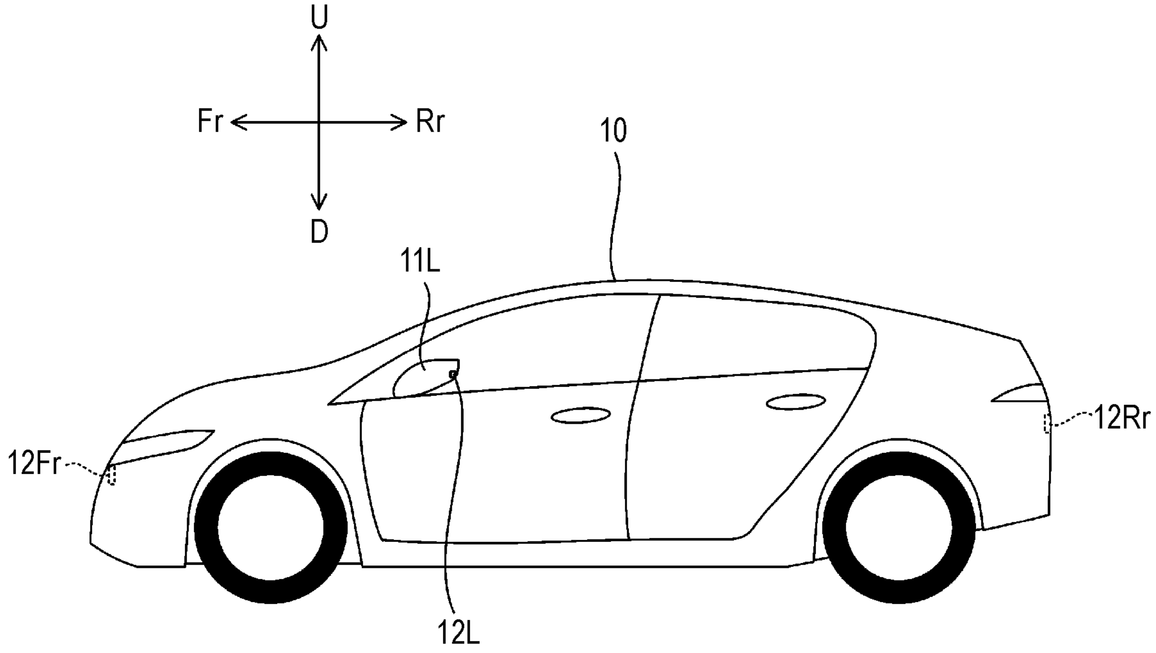
FIG. 1 is a side view illustrating an example of a vehicle on which a control device of the present embodiment is mounted.

Hereinafter, an embodiment of a control device, a control method, and a storage medium storing a control program according to the present disclosure will be described with reference to the accompanying drawings. Note that the drawings are to be viewed according to orientation of the reference signs. In the present specification and the like, in order to simplify and clarify the description, a front-rear direction, a left-right direction, and an up-down direction are described in accordance with directions viewed from a driver of a vehicle 10 illustrated in FIGS. 1 and 2. In the drawings, a front side of the vehicle 10 is denoted by Fr, a rear side thereof is denoted by Rr, a left side thereof is denoted by L, a right side thereof is denoted by R, an upper side thereof is denoted by U, and a lower side thereof is denoted by D.

<Vehicle 10 on which Control Device of the Present Disclosure is Mounted>

Figure 2:
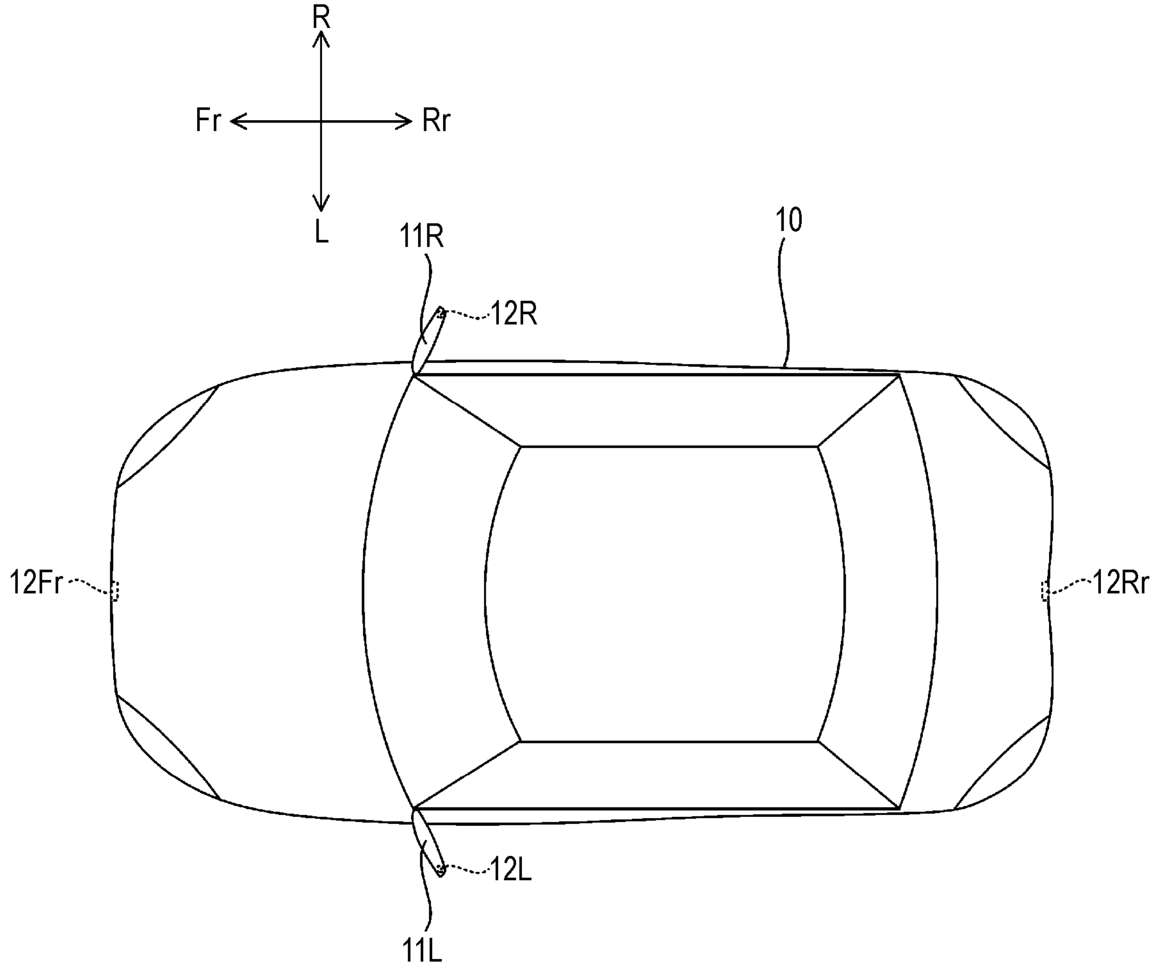
FIG. 2 is a top view of the vehicle illustrated in FIG. 1.

FIG. 1 is a side view of the vehicle 10 on which a control device according to the present disclosure is mounted. FIG. 2 is a top view of the vehicle 10 illustrated in FIG. 1. The vehicle 10 is an example of a moving body of the present disclosure.

The vehicle 10 is an automobile that includes a driving source (not illustrated) and wheels including drive wheels driven by power of the driving source and steerable steering wheels. In the present embodiment, the vehicle 10 is a four-wheeled automobile having a pair of left and right front wheels and a pair of left and right rear wheels. The driving source of the vehicle 10 is, for example, an electric motor. The driving source of the vehicle 10 may be an internal combustion engine such as a gasoline engine or a diesel engine, or may be a combination of an electric motor and an internal combustion engine. The driving source of the vehicle 10 may drive the pair of left and right front wheels, the pair of left and right rear wheels, or four wheels of the pair of left and right front wheels and the pair of left and right rear wheels. Both the front wheels and the rear wheels may be steerable steering wheels, or the front wheels or the rear wheels may be steerable steering wheels.

The vehicle 10 further includes side mirrors 11L and 11R. The side mirrors 11L and 11R are mirrors (rearview mirrors) that are provided at outer sides of front seat doors of the vehicle 10 and that allow a driver to check the rear side and rear lateral sides. Each of the side mirrors 11L and 11R is fixed to a body of the vehicle 10 by a rotation shaft extending in the up-down direction, and can be opened and closed by rotating about the rotation shaft. The side mirrors 11L and 11R are electrically opened and closed by, for example, a driver's operation on an operation part provided in the vicinity of a driver's seat of the vehicle 10. A width of the vehicle 10 in a state where the side mirrors 11L and 11R are closed is narrower than the width of the vehicle 10 in a state where the side mirrors 11L and 11R are opened. Therefore, for example, when the vehicle 10 enters a narrow parking space, the driver often performs an operation of setting the side mirrors 11L and 11R to the closed state so that the vehicle 10 does not collide with an obstacle in the surroundings of the vehicle 10.

The vehicle 10 further includes a front camera 12Fr, a rear camera 12Rr, a left lateral-side camera 12L, and a right lateral-side camera 12R. The front camera 12Fr is a digital camera that is provided in a front portion of the vehicle 10 and images a front side of the vehicle 10. The rear camera 12Rr is a digital camera that is provided in a rear portion of the vehicle 10 and images a rear side of the vehicle 10. The left lateral-side camera 12L is a digital camera that is provided in the left side mirror 11L of the vehicle 10 and images a left lateral side of the vehicle 10. The right lateral-side camera 12R is a digital camera that is provided in the right side mirror 11R of the vehicle 10 and images a right lateral side of the vehicle 10. The front camera 12Fr, the rear camera 12Rr, the left lateral-side camera 12L, and the right lateral-side camera 12R are examples of an imaging device of the present disclosure.

<Internal Configuration of Vehicle 10>

Figure 3:
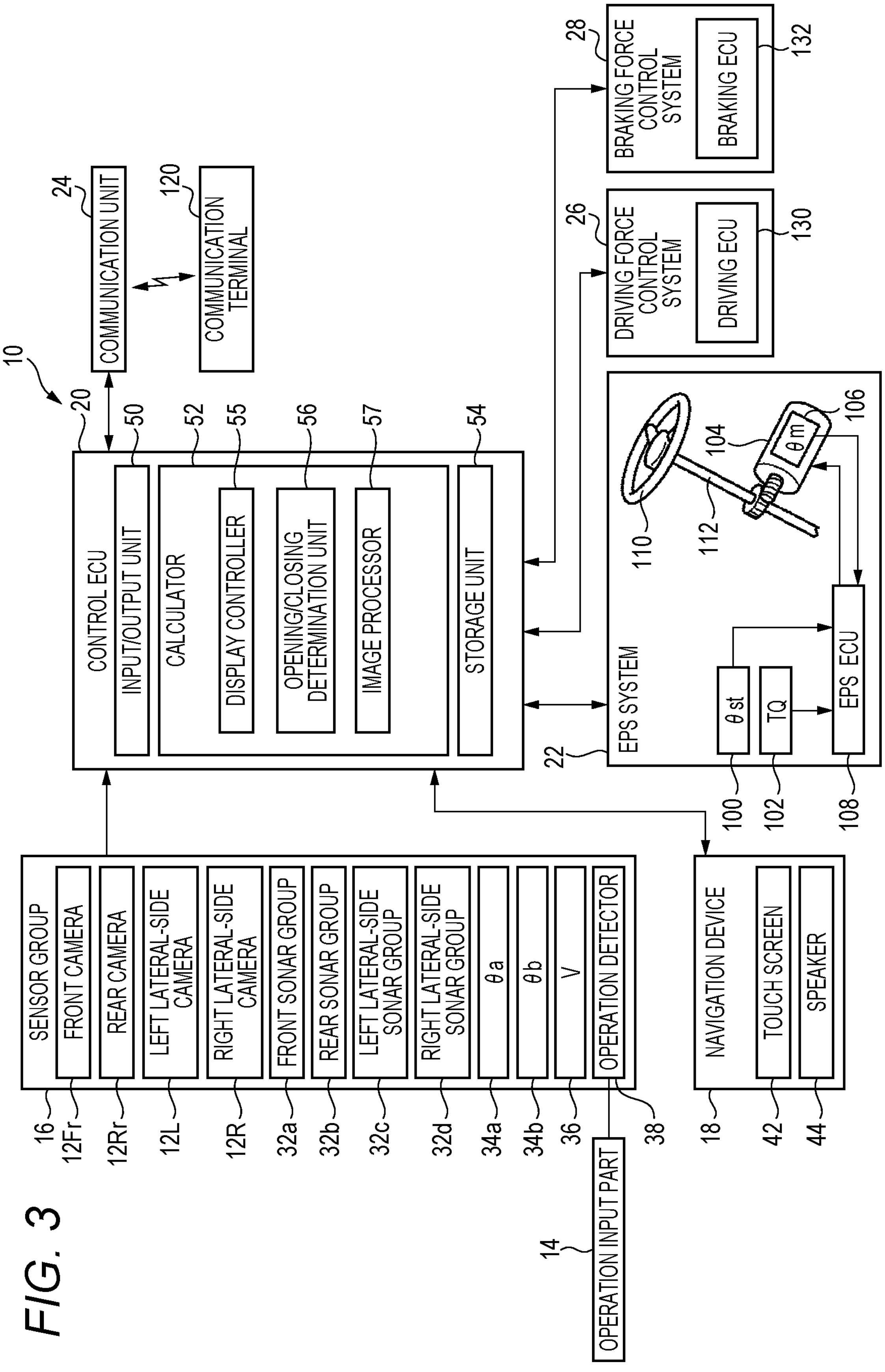
FIG. 3 is a block diagram illustrating an internal configuration of the vehicle illustrated in FIG. 1.

FIG. 3 is a block diagram illustrating an example of an internal configuration of the vehicle 10 illustrated in FIG. 1. As illustrated in FIG. 3, the vehicle 10 includes a sensor group 16, a navigation device 18, a control electronic control unit (ECU) 20, an electric power steering (EPS) system 22, and a communication unit 24. The vehicle 10 further includes a driving force control system 26 and a braking force control system 28. The control ECU 20 is an example of a control device of the present disclosure.

The sensor group 16 obtains various types of detection values used for control performed by the control ECU 20.

The sensor group 16 includes the front camera 12Fr, the rear camera 12Rr, the left lateral-side camera 12L, and the right lateral-side camera 12R. In addition, the sensor group 16 includes a front sonar group 32*a*, a rear sonar group 32*b*, a left lateral-side sonar group 32*c*, and a right lateral-side sonar group 32*d*. Further, the sensor group 16 includes wheel sensors 34*a* and 34*b*, a vehicle speed sensor 36, and an operation detector 38.

The front camera 12Fr, the rear camera 12Rr, the left lateral-side camera 12L, and the right lateral-side camera 12R output surroundings images obtained by imaging the surroundings of the vehicle 10. The surroundings images captured by the front camera 12Fr, the rear camera 12Rr, the left lateral-side camera 12L, and the right lateral-side camera 12R are referred to as a front image, a rear image, a left lateral-side image, and a right lateral-side image, respectively. An image formed by the left lateral-side image and the right lateral-side image may be referred to as a lateral-side image.

The front sonar group 32*a*, the rear sonar group 32*b*, the left lateral-side sonar group 32*c*, and the right lateral-side sonar group 32*d* emit sound waves to the surroundings of the vehicle 10 and receive reflected sounds from other objects. The front sonar group 32*a* includes, for example, four sonars. The sonars constituting the front sonar group 32*a* are provided at an obliquely left front side, a front left side, a front right side, and an obliquely right front side of the vehicle 10, respectively. The rear sonar group 32*b* includes, for example, four sonars. The sonars constituting the rear sonar group 32*b* are provided at an obliquely left rear side, a rear left side, a rear right side, and an obliquely right rear side of the vehicle 10, respectively. The left lateral-side sonar group 32*c* includes, for example, two sonars. The sonars constituting the left lateral-side sonar group 32*c* are provided at a front side and a rear side of a left side portion of the vehicle 10, respectively. The right lateral-side sonar group 32*d* includes, for example, two sonars. The sonars constituting the right lateral-side sonar group 32*d* are provided at a front side and a rear side of a right side portion of the vehicle 10, respectively.

The wheel sensors 34*a* and 34*b* detect a rotation angle of a wheel of the vehicle 10. The wheel sensors 34*a* and 34*b* may be implemented by an angle sensor or a displacement sensor. The wheel sensors 34*a* and 34*b* output a detection pulse each time the wheel rotates by a predetermined angle. The detection pulse output from the wheel sensors 34*a* and 34*b* is used to calculate the rotation angle of the wheel and a rotation speed of the wheel. A movement distance of the vehicle 10 is calculated based on the rotation angle of the wheel. The wheel sensor 34*a* detects, for example, a rotation angle $\theta a$ of a left rear wheel. The wheel sensor 34*b* detects, for example, a rotation angle $\theta b$ of a right rear wheel.

The vehicle speed sensor 36 detects a speed of a vehicle body of the vehicle 10, that is, a vehicle speed V, and outputs the detected vehicle speed V to the control ECU 20. The vehicle speed sensor 36 detects the vehicle speed V based on, for example, rotation of a countershaft of the transmission.

The operation detector 38 detects what operation is performed by a user using an operation input part 14, and outputs the detected operation to the control ECU 20. The operation input part 14 includes various user interfaces such as a door mirror switch for switching between an opened state and a closed state of the side mirrors 11L and 11R and a shift lever (a select lever or a selector).

The navigation device 18 detects a current position of the vehicle 10 using, for example, a global positioning system (GPS), and guides the user to a route to a destination. The navigation device 18 includes a storage device (not illustrated) provided with a map information database.

The navigation device 18 includes a touch screen 42 and a speaker 44. The touch screen 42 functions as an input device and a display device of the control ECU 20. The user inputs various commands via the touch screen 42. The touch screen 42 displays various screens. The user can input, for example, a command related to parking assistance via the touch screen 42. In addition, the touch screen 42 may display a screen related to parking assistance. For example, the touch screen 42 displays a parking assistance button for requesting parking assistance of the vehicle 10. The parking assistance button includes an automatic parking assistance button for requesting parking by automatic steering of the control ECU 20 and a parking assistance button for requesting assistance at the time when parking is to be performed by an operation of the driver. Components other than the touch screen 42, for example, a smartphone may be used as the input device or the display device. The speaker 44 outputs various types of guidance information to an occupant of the vehicle 10 by voice.

The control ECU 20 includes an input/output unit 50, a calculator 52, and a storage unit 54. The calculator 52 is implemented by, for example, circuitry such as a central processing unit (CPU). The calculator 52 performs various types of control by controlling units based on a program stored in the storage unit 54.

The calculator 52 includes a display controller 55, an object presence/absence determination unit 56, and an image processor 57. The image processor 57 generates a surroundings image of the vehicle 10 based on imaging data obtained by the cameras of the vehicle 10. Specifically, the image processor 57 generates a synthesized image by synthesizing respective pieces of imaging data obtained by the front camera 12Fr, the rear camera 12Rr, the left lateral-side camera 12L, and the right lateral-side camera 12R, and generates a bird's-eye view image of the vehicle 10 and the surroundings of the vehicle 10 as viewed from above.

In addition, the image processor 57 performs image processing of three-dimensionally reconstructing the synthesized image of the pieces of imaging data obtained by the front camera 12Fr, the rear camera 12Rr, the left lateral-side camera 12L, and the right lateral-side camera 12R, and generates a three-dimensional image virtually showing a state in which the vehicle 10 and the surroundings of the vehicle 10 are rotated and viewed from, for example, an obliquely upper side.

In addition, the image processor 57 sets a mask area in the generated surroundings image (the bird's-eye view image and the three-dimensional image). The mask area means an area set to hide the body of the vehicle 10 reflected in a captured image of a camera. The mask area is set as an area having a shape surrounding the vehicle 10. The image processor 57 displays a vehicle image, which indicates the vehicle 10, in a superimposed manner in a portion corresponding to a space in which the vehicle 10 is located in the mask area. The vehicle image is an image showing a state where the vehicle 10 is viewed from above, and is generated in advance and stored in the storage unit 54 or the like. The image processor 57 may set mask areas in the lateral-side images (the left lateral-side image and the right lateral-side image) obtained by the left lateral-side camera 12L and the right lateral-side camera 12R.

In addition, the image processor 57 performs re-synthesis processing on the synthesized image of the imaging data obtained by the cameras to change a boundary region between adjacent captured images in the synthesized image. For example, w % ben a predetermined object present in a captured image is displayed overlapping a boundary region, the image processor 57 changes the boundary region by performing re-synthesis processing according to a position of the predetermined target. The predetermined object is an object to be watched by the driver of the vehicle 10, such as a parking frame (parking space), a parking frame line, or an obstacle.

The object presence/absence determination unit 56 determines whether a predetermined object is present at a boundary region of the pieces of imaging data in the bird's-eye view image and the three-dimensional image generated by the image processor 57.

The display controller 55 causes the display device of the vehicle 10 to display the surroundings image generated by the image processor 57. Specifically, the display controller 55 causes the touch screen 42 to display the bird's-eye view image and the three-dimensional image of the vehicle 10 generated by synthesizing the respective pieces of imaging data of the front camera 12Fr, the rear camera 12Rr, the left lateral-side camera 12L, and the right lateral-side camera 12R. In addition, the display controller 55 causes the touch screen 42 to display a bird's-eye view image and a three-dimensional image on which re-synthesis processing of the imaging data is performed based on a determination result of the object presence/absence determination unit 56.

Further, the control ECU 20 performs parking assistance of the vehicle 10 by automatic steering in which an operation of a steering wheel 110 is automatically performed under control of the control ECU 20. The parking assistance is, for example, control of performing automatic steering so as to stop in a parking frame selected by the driver of the vehicle 10 at the time of parking. In the assistance of automatic steering, an accelerator pedal (not illustrated), a brake pedal (not illustrated), and the operation input part 14 are automatically operated. In addition, when the user operates the accelerator pedal, the brake pedal, and the operation input part 14 to park the vehicle 10, the control ECU 20 performs auxiliary assistance.

The EPS system 22 includes a steering angle sensor 100, a torque sensor 102, an EPS motor 104, a resolver 106, and an EPS ECU 108. The steering angle sensor 100 detects a steering angle θst of the steering wheel 110. The torque sensor 102 detects a torque TQ applied to the steering wheel 110.

The EPS motor 104 applies a driving force or a reaction force to a steering column 112 coupled to the steering wheel 110, thereby enabling operation assistance of the steering wheel 110 and automatic steering at the time of parking assistance for the driver. The resolver 106 detects a rotation angle θm of the EPS motor 104. The EPS ECU 108 controls the entire EPS system 22. The EPS ECU 108 include an input/output unit (not illustrated), a calculator (not illustrated), and a storage unit (not illustrated), for example.

The communication unit 24 enables wireless communication with another communication device 120. The other communication device 120 is a base station, a communication device of another vehicle, an information terminal such as a smartphone possessed by an occupant of the vehicle 10, or the like.

The driving force control system 26 is provided with a driving ECU 130. The driving force control system 26 executes driving force control of the vehicle 10. The driving ECU 130 controls an engine or the like (not illustrated) based on an operation that the user performs on the accelerator pedal (not illustrated), thereby controlling a driving force of the vehicle 10.

The braking force control system 28 is provided with a braking ECU 132. The braking force control system 28 executes braking force control of the vehicle 10. The braking ECU 132 controls a braking force of the vehicle 10 by controlling a brake mechanism or the like (not illustrated) based on an operation that the user performs on the brake pedal (not illustrated), thereby controlling a braking force of the vehicle 10.

<Change of Boundary Region by Image Processor 57>

Next, processing of changing a boundary region in a synthesized image of pieces of imaging data will be described with reference to FIGS. 4 and 5.

Figure 4:
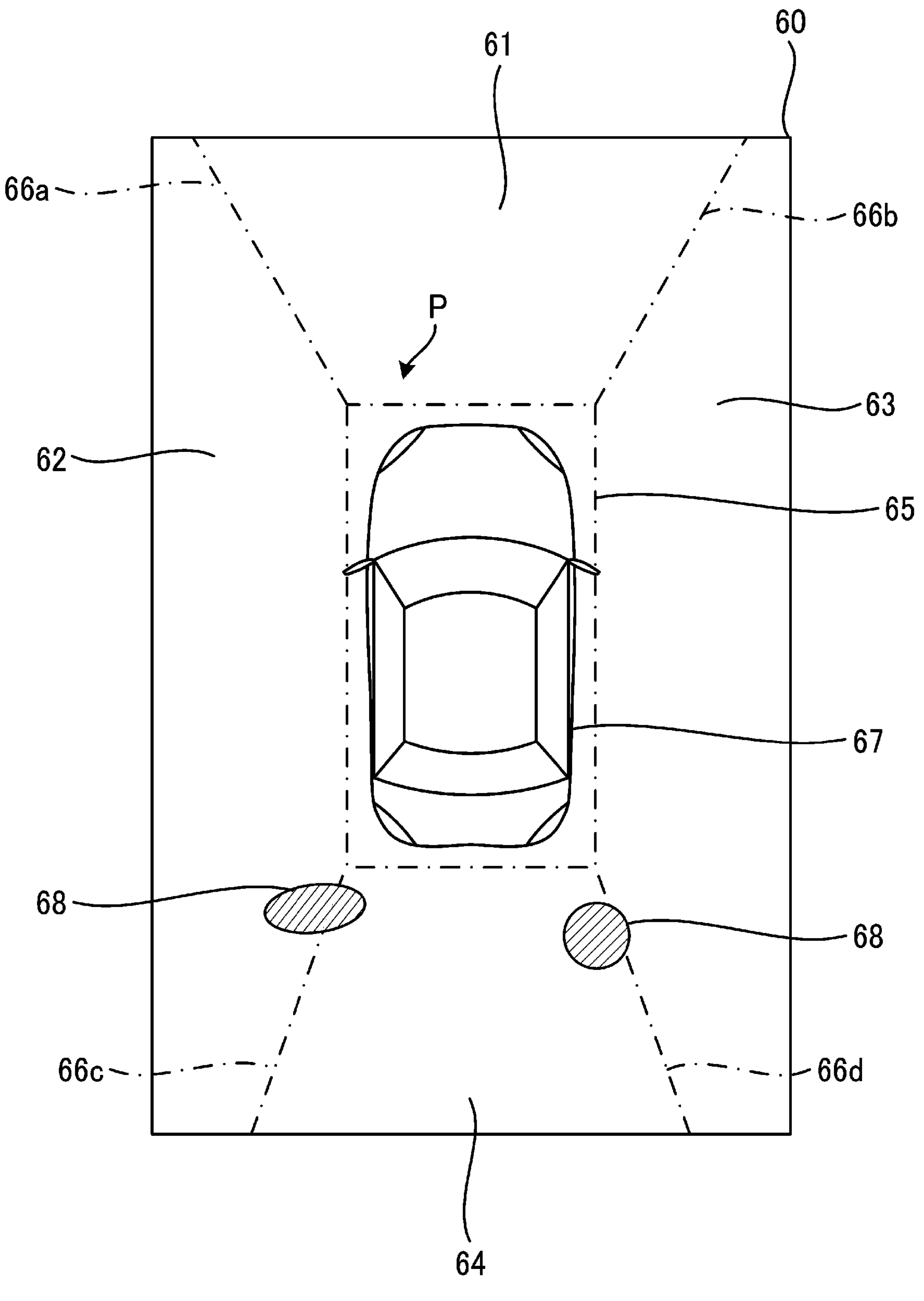
FIG. 4 is a diagram illustrating an example of a synthesized image generated using respective pieces of imaging data of a plurality of cameras.

FIG. 4 is a diagram illustrating an example of a synthesized image generated using respective pieces of imaging data obtained by the front camera 12Fr, the rear camera 12Rr, the left lateral-side camera 12L, and the right lateral-side camera 12R. FIG. 5 is a diagram illustrating an example of a synthesized image generated by changing a boundary region of the synthesized image illustrated in FIG. 4.

As illustrated in FIG. 4, when generating a synthesized image 60, the image processor 57 performs viewpoint conversion and correction in image distortion and the like on imaging data of imaging areas imaged by the front camera 12Fr, the rear camera 12Rr, the left lateral-side camera 12L, and the right lateral-side camera 12R so as to obtain images presenting the effect of viewing down from a predetermined viewpoint position vertically above the vehicle 10. Further, from converted images obtained by the conversion processing, the image processor 57 extracts a front image 61, a left lateral-side image 62, a right lateral-side image 63, and a rear image 64 having predetermined view angle ranges that are set for respective converted images so that images on both sides of a boundary region match with each other. Then, the image processor 57 synthesizes these images 61 to 64 to generate the synthesized image 60. A mask area 65 is provided in a central portion of the synthesized image 60 so as to surround the vehicle 10. A vehicle image 67 indicating the vehicle 10 may be displayed in the mask area 65.

Boundary lines 66*a* to 66*d*, which are boundary regions of the captured images, are present between adjacent captured images of the front image 61, the left lateral-side image 62, the right lateral-side image 63, and the rear image 64. View angle ranges extracted from the front image 61, the left lateral-side image 62, the right lateral-side image 63, and the rear image 64 may be field angle ranges by which boundary regions between adjacent captured images match each other, and are not limited to unique ranges. Therefore, positions of the boundary lines 66*a* to 66*d* between the adjacent captured images can also be changed according to the extracted view angle ranges.

View angle ranges of images that can be captured by the front camera 12Fr, the rear camera 2Rr, the left lateral-side camera 12L, and the right lateral-side camera 12R are set to a size such that adjacent captured images overlap each other in an area of a certain extent. Therefore, a boundary region between adjacent captured images can be arbitrarily extracted from within the overlapping area, under a condition of matching of boundary region.

Boundary region images, particularly the images at the boundary lines 66*a* to 66*d*, are extracted so that images on both sides of a boundary region match with each other. But since the boundary region images are synthesis portions of different images, the visibility is often lowered due to occurrence of distortion. Therefore, in a case where a predetermined object requiring good visibility is imaged to be overlapped by the boundary lines 66_a_ to 66_d_ in the synthesized image 60, the image processor 57 changes a position of a boundary region (boundary lines 66_a_ to 66_d_) so that the boundary lines 66_a_ to 66_d_ do not overlap the object.

For example, it is assumed that the synthesized image 60 illustrated in FIG. 4 is a synthesized image indicating a state where a vehicle is about to be parked in a certain parking space P. An obstacle 68 is present behind the vehicle in the parking space P. In this case, the obstacle 68 requires good visibility as a predetermined object. However, in the synthesized image 60, the obstacle 68 exists on the boundary line 66_c_ between the left lateral-side image 62 and the rear image 64 and on the boundary line 66_d_ between the right lateral-side image 63 and the rear image 64.

Figure 5:
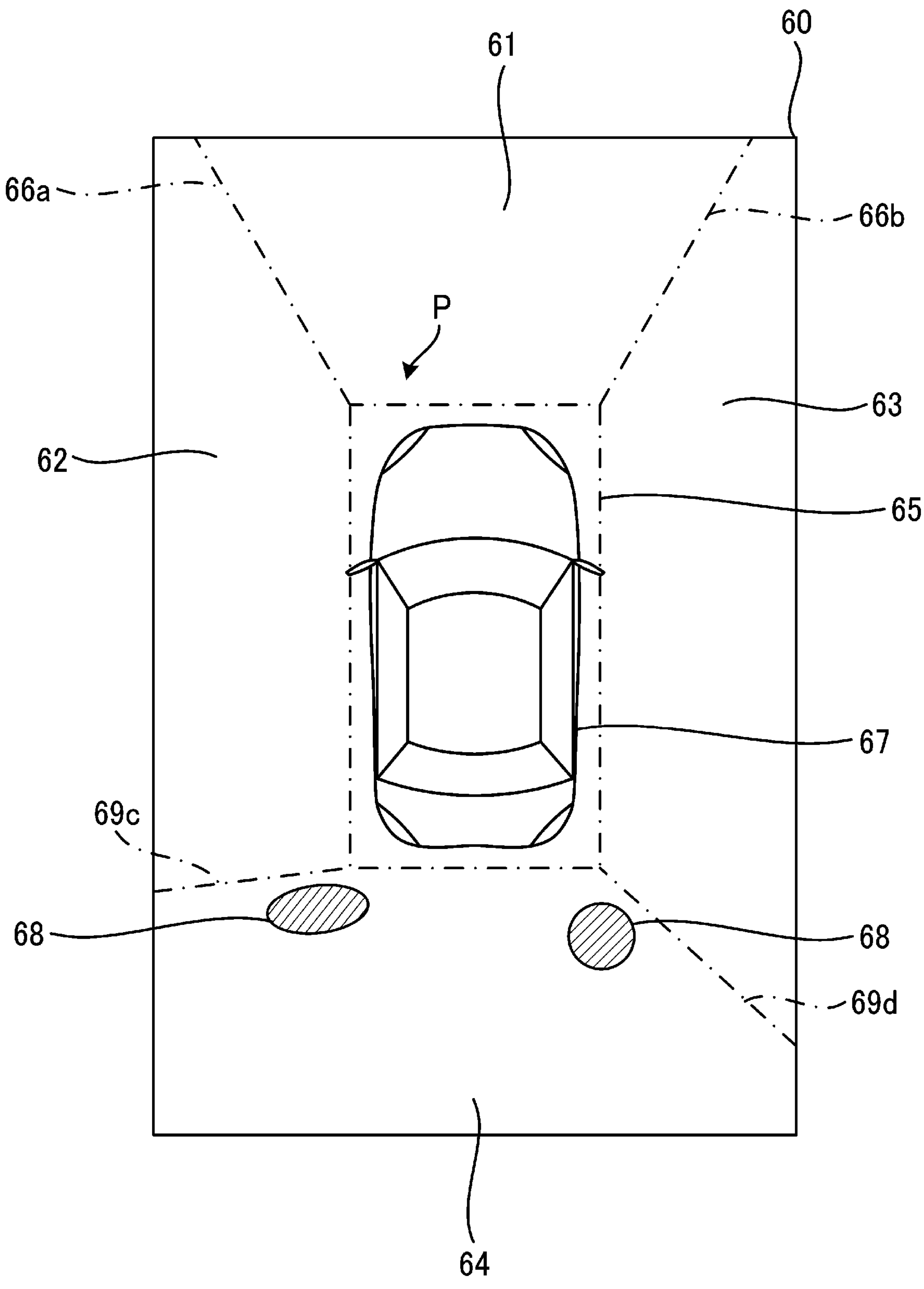
FIG. 5 is a diagram illustrating a synthesized image obtained by changing a boundary region of the synthesized image illustrated in FIG. 4.

Therefore, for example, as illustrated in FIG. 5, the image processor 57 changes the boundary regions so that a boundary line 69_c_ between the left lateral-side image 62 and the rear image 64 and a boundary line 69_d_ between the right lateral-side image 63 and the rear image 64 do not overlap the obstacle 68. Specifically, the boundary line 69_c_ between the left lateral-side image 62 and the rear image 64 and the boundary line 69_d_ between the right lateral-side image 63 and the rear image 64 are shifted toward lateral sides, respectively. Accordingly, at the time of parking the vehicle into the parking space P, the visibility of the obstacle 68 is improved, and the obstacle 68 can be quickly and reliably recognized.

<Display Control Performed by Control ECU 20>

Next, display control performed by the control ECU 20 will be described.

First Embodiment

A first embodiment of the display control performed by the control ECU 20 will be described with reference to FIGS. 6 to 8.

Figure 6:
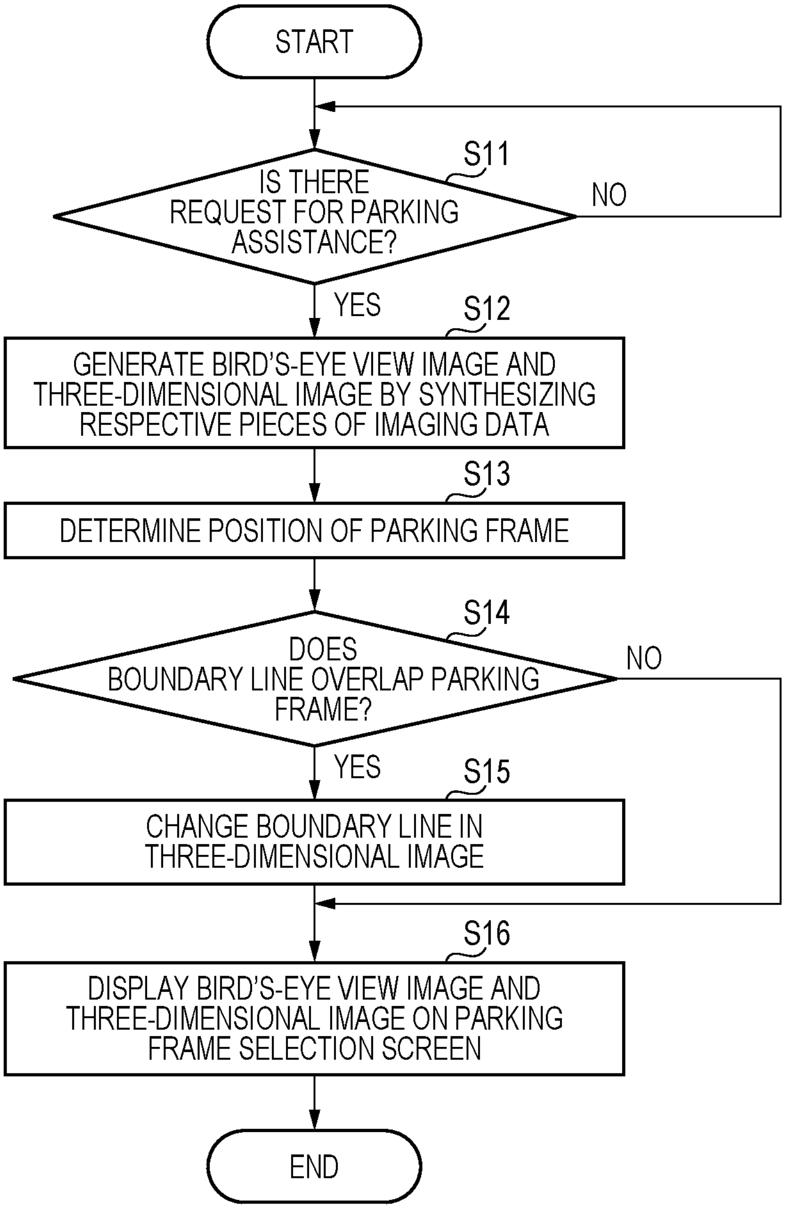
FIG. 6 is a flowchart illustrating display control performed by a control ECU according to a first embodiment.

FIG. 6 is a flowchart illustrating display control performed by the control ECU 20 when a parking frame is selected to park the vehicle 10. FIG. 7 is a diagram illustrating an example of a bird's-eye view image generated using respective pieces of imaging data obtained by the front camera 12Fr, the rear camera 12Rr, the left lateral-side camera 12L, and the right lateral-side camera 12R of the vehicle 10. FIG. 8 is a diagram illustrating an example of a bird's-eye view image and a three-dimensional image displayed on the touch screen 42 of the vehicle 10.

For example, it is assumed that a driver driving the vehicle 10 attempts to park the vehicle 10 in a parking lot. The control ECU 20 determines whether there is a request for parking assistance from the driver of the vehicle 10 (step S11). The parking assistance request is output to the control ECU 20 as a parking assistance signal, for example, based on the driver's operation on an automatic parking assistance button or a parking auxiliary assistance button in the operation input part 14.

When there is no request for parking assistance in step S11 (step S11: No), the control ECU 20 waits until there is a request for parking assistance.

When there is a request for parking assistance in step S11 (step S11: Yes), the control ECU 20 causes the image processor 57 to generate a bird's-eye view image and a three-dimensional image based on a synthesized image of respective pieces of imaging data obtained by the front camera 12Fr, the rear camera 12Rr, the left lateral-side camera 12L, and the right lateral-side camera 12R (step S12).

Next, the control ECU 20 causes the image processor 57 to determine, based on a generated image, whether there is a parking frame in the parking lot in which the vehicle 10 can be parked, that is, an available parking frame in which no vehicle is parked (step S13). The determination as to whether there is an available parking frame may be made based on the synthesized image of the respective pieces of imaging data obtained by the front camera 12Fr, the rear camera 12Rr, the left lateral-side camera 12L, and the right lateral-side camera 12R, or may be made based on images of the respective pieces of imaging data before being synthesized. Alternatively, the determination may be made based on the bird's-eye view image or the three-dimensional image generated based on the synthesized image.

Figure 7:
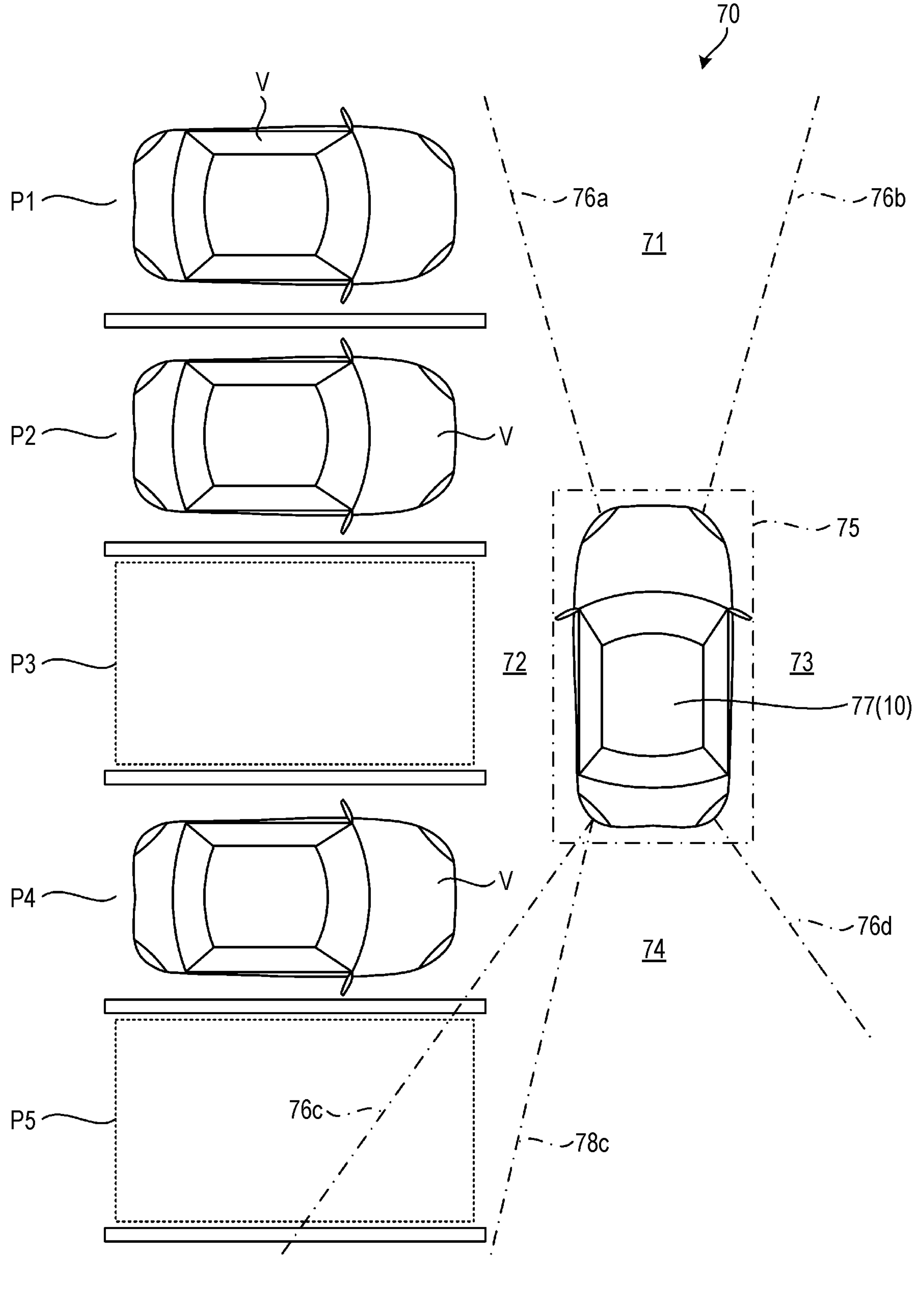
FIG. 7 is a diagram illustrating an example of a bird's-eye view image generated based on respective pieces of imaging data of a plurality of cameras.

For example, FIG. 7 illustrates a bird's-eye view image 70 used for determining whether there is an available parking frame. In the bird's-eye view image 70, a state is displayed where other vehicles V are parked in three parking frames P1, P2, and P4 among five parking frames P1 to P5 and no other vehicles V are parked in the two parking frames P3 and P5. Boundary lines 76_a_ to 76_d_ are displayed at boundary portions of a front image 71, a left lateral-side image 72, a right lateral-side image 73, and a rear image 74. A vehicle image 77 indicating the vehicle 10, which is an own vehicle, is displayed in a mask area 75.

In step S13, the control ECU 20 determines, based on the bird's-eye view image 70, that the parking frames P3 and P5 are available parking frames.

Next, the control ECU 20 causes the image processor 57 to determine whether the boundary lines 76_a_ to 76_d_ overlap the parking frames P3 and P5 determined to be available (step S14).

When the boundary lines 76_a_ to 76_d_ do not overlap the available parking frames P3 and P5 in step S14 (step S14: No), the control ECU 20 causes the display controller 55 to display the bird's-eye view image and the three-dimensional image generated in step S12 on the touch screen 42 of the vehicle 10 as a parking frame selection screen for parking the vehicle 10 without changing the bird's-eye view image and the three-dimensional image (step S16).

When the boundary lines 76_a_ to 76_d_ overlap the available parking frames P3 and P5 in step S14 (step S14: Yes), the control ECU 20 causes the image processor 57 to change the boundary lines by performing the synthesis processing of the respective pieces of imaging data again so that the boundary lines overlapping the parking frames P3 and P5 among the boundary lines 76_a_ to 76_d_ in the three-dimensional image generated in step S12 do not overlap the parking frames P3 and P5 (step S15).

Next, the control ECU 20 causes the display controller 55 to display, on the touch screen 42 and as a parking frame selection screen, the bird's-eye view image generated in step S12 without change and the three-dimensional image that is generated in step S15 so that the boundary lines 76_a_ to 76_d_ do not overlap the parking frames P3 and P5 (step S16).

For example, in the case of the bird's-eye view image 70 illustrated in FIG. 7, the boundary line 76_c_ among the boundary lines 76_a_ to 76_d_ overlaps the available parking frame P5. Therefore, the control ECU 20 causes the image processor 57 to perform again the synthesis processing on the respective pieces of imaging data so that the boundary line 76_c_ does not overlap the available parking frame P5, and changes to a boundary line 78_c_ that does not overlap the parking frame P5.

Figure 8:
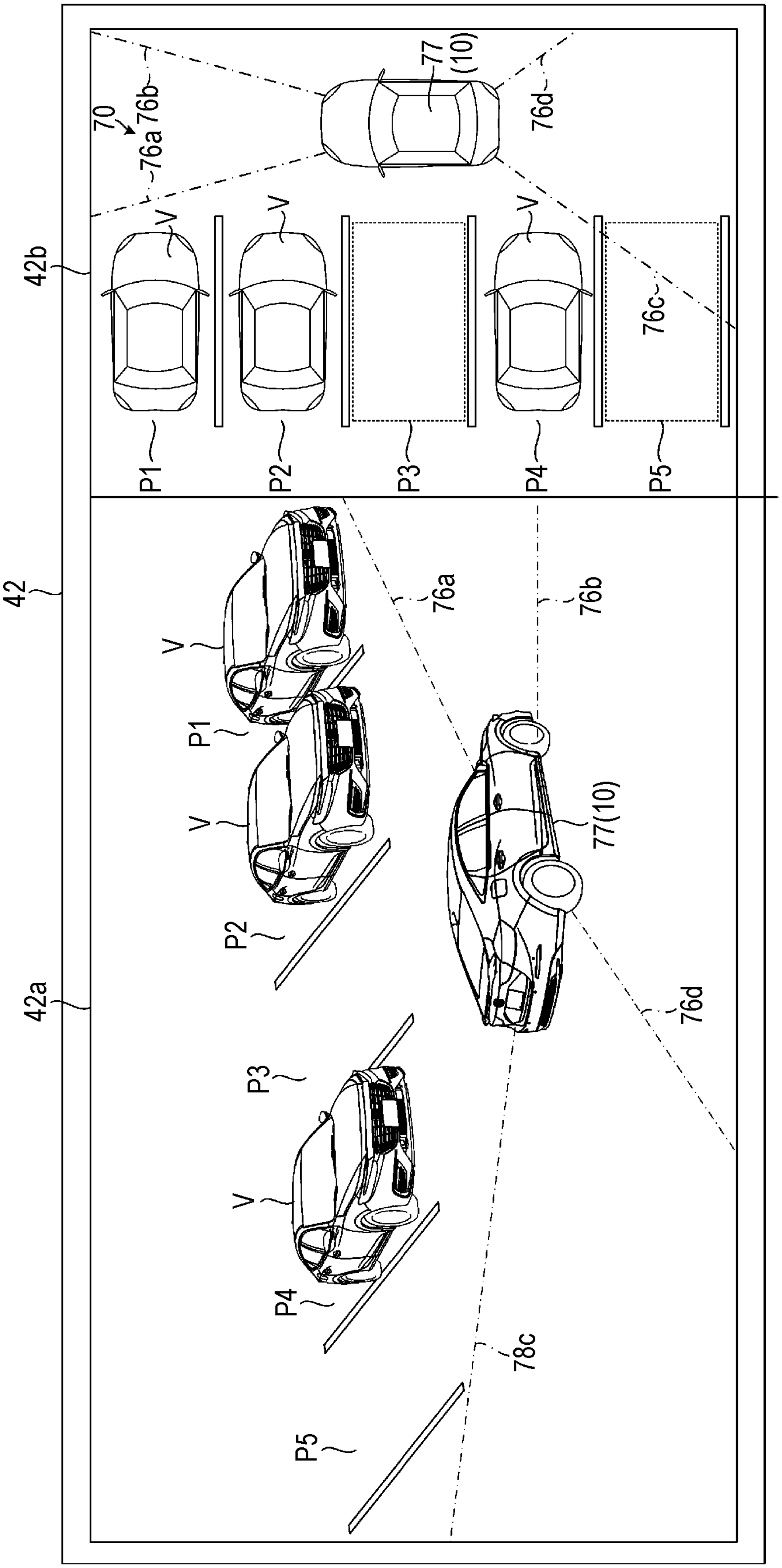
FIG. 8 is a diagram illustrating an example of a bird's-eye view image and a three-dimensional image displayed on a touch screen of a vehicle.

Then, as illustrated in FIG. 8, among a first display area 42_a_ and a second display area 42_b_ provided in the touch screen 42, the control ECU 20 causes the display controller

55 to display the three-dimensional image in which the boundary lines do not overlap the parking frame P5 in a first display area 42*a*, and to display the bird's-eye view image (the bird's-eye view image 70 in which the boundary line 76*c* is not changed) generated in step S12 in the second display area 42*b*.

The driver of the vehicle 10 selects a parking frame by touching an available parking frame (for example, any one of the parking frames P3 and P5) displayed on the touch screen 42. The control ECU 20 performs parking assistance for parking the vehicle 10 in the selected parking frame by automatic steering.

Second Embodiment

Figure 9:
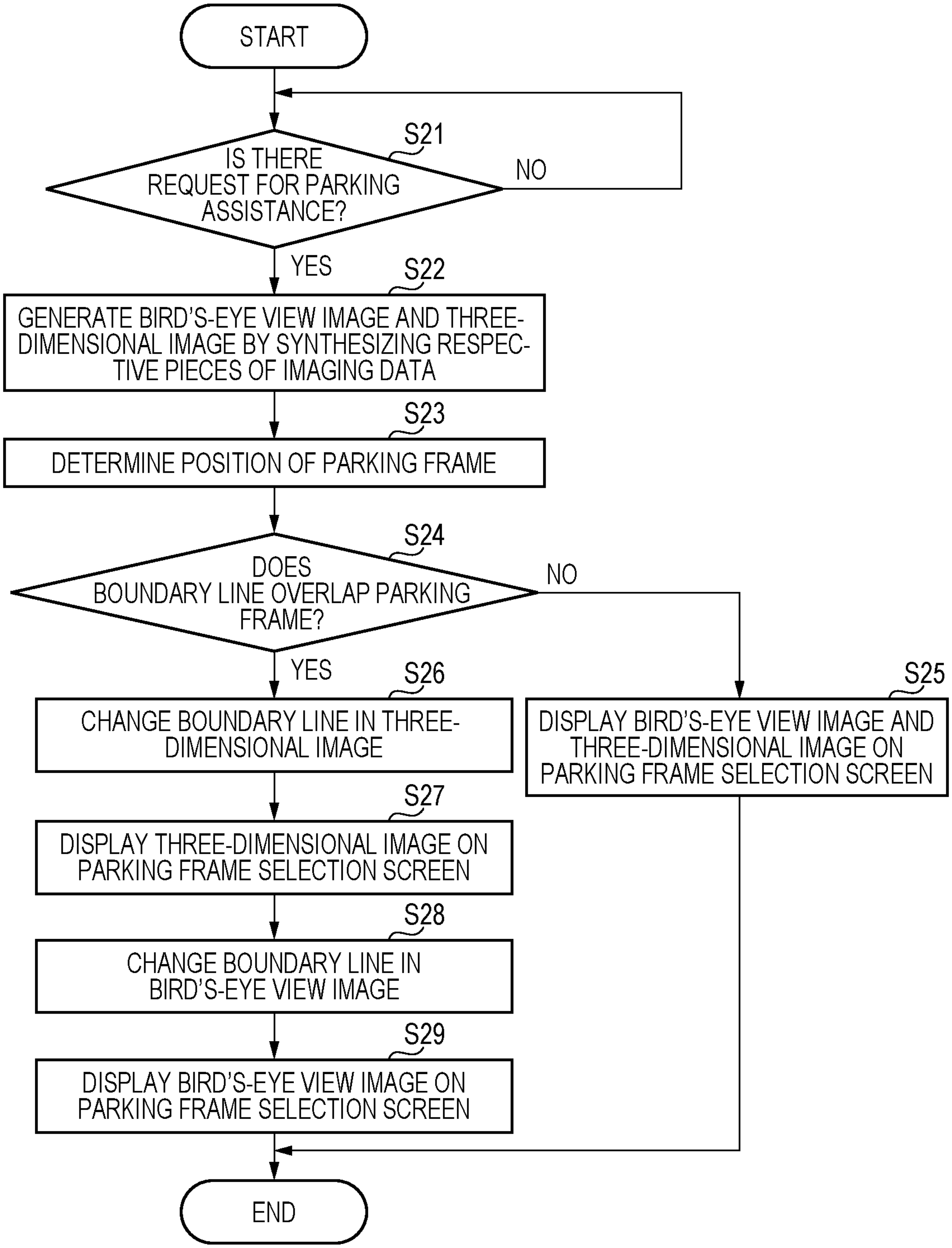
FIG. 9 is a flowchart illustrating display control performed by a control ECU according to a second embodiment.

A second embodiment of the display control performed by the control ECU 20 will be described with reference to the flowchart illustrated in FIG. 9. In the first embodiment described above, the display control of changing a boundary region (boundary line) of only a three-dimensional image among a bird's-eye view image and the three-dimensional image displayed on the touch screen 42 when a predetermined object (parking frame) is present on the boundary line has been described. In the second embodiment, display control of changing boundary regions (boundary lines) in both a three-dimensional image and a bird's-eye view image will be described.

The control ECU 20 determines whether there is a request for parking assistance from the driver of the vehicle 10 (step S21). The parking assistance request is output to the control ECU 20 based on an operation on an automatic parking assistance button or a parking auxiliary assistance button as in the first embodiment.

When there is no request for parking assistance in step S21 (step S21: No), the control ECU 20 waits until there is a request for parking assistance.

When there is a request for parking assistance in step S21 (step S21: Yes), the control ECU 20 causes the image processor 57 to generate a bird's-eye view image and a three-dimensional image based on a synthesized image of respective pieces of imaging data obtained by the front camera 12Fr, the rear camera 12Rr, the left lateral-side camera 12L, and the right lateral-side camera 12R (step S22).

Next, the control ECU 20 causes the image processor 57 to determine, based on a generated image, whether there is a parking frame in the parking lot in which the vehicle 10 can be parked, that is, an available parking frame in which no vehicle is parked (step S23). As in the first embodiment, the determination as to whether there is an available parking frame may be made based on the synthesized image of the respective pieces of imaging data, may be made based on images of the respective pieces of imaging data before being synthesized, or may be made based on the bird's-eye view image or the three-dimensional image generated from the synthesized image.

Next, as in the first embodiment, the control ECU 20 determines whether the boundary lines 76*a* to 76*d* overlap the parking frames P3 and P5 (see FIG. 7) determined to be available (step S24).

When the boundary lines 76*a* to 76*d* do not overlap the available parking frames P3 and P5 in step S24 (step S24: No), the control ECU 20 causes the display controller 55 to display the bird's-eye view image and the three-dimensional image generated in step S22 without change on the touch screen 42 of the vehicle 10 as a parking frame selection screen (step S25).

When the boundary lines 76*a* to 76*d* overlap the available parking frames P3 and P5 in step S24 (step S24: Yes), the control ECU 20 causes the image processor 57 to change the boundary lines by performing the synthesis processing of the respective pieces of imaging data again so that firstly boundary lines overlapping the parking frames P3 and P5 among the boundary lines 76*a* to 76*d* in the three-dimensional image, among the bird's-eye view image and the three-dimensional image generated in step S22, do not overlap the parking frames P3 and P5 (step S26).

The control ECU 20 displays, on the touch screen 42 and as a parking frame selection screen, the three-dimensional image that is generated again in step S26 so that the boundary lines 76*a* to 76*d* do not overlap the parking frames P3 and P5 (step S27).

Next, the control ECU 20 changes the boundary lines by performing the synthesis processing of the respective pieces of imaging data again so that the boundary lines overlapping the parking frames P3 and P5 among the boundary lines 76*a* to 76*d* in the bird's-eye view image, among the bird's-eye view image and the three-dimensional image generated in step S22, do not overlap the parking frames P3 and P5 (step S28).

The control ECU 20 causes the display controller 55 to display, on the touch screen 42 and as a parking frame selection screen, the bird's-eye view image that is generated again in step S28 so that the boundary lines 76*a* to 76*d* do not overlap the parking frames P3 and P5 (step S29).

In this case, in FIG. 8, the bird's-eye view image displayed in the second display area 42*b* of the touch screen 42 is also displayed as an image in which the boundary lines do not overlap the parking frame P5, similarly to the three-dimensional image displayed in the first display area 42*a*.

Third Embodiment

A third embodiment of the display control performed by the control ECU 20 will be described with reference to FIGS. 10 to 12.

Figure 10:
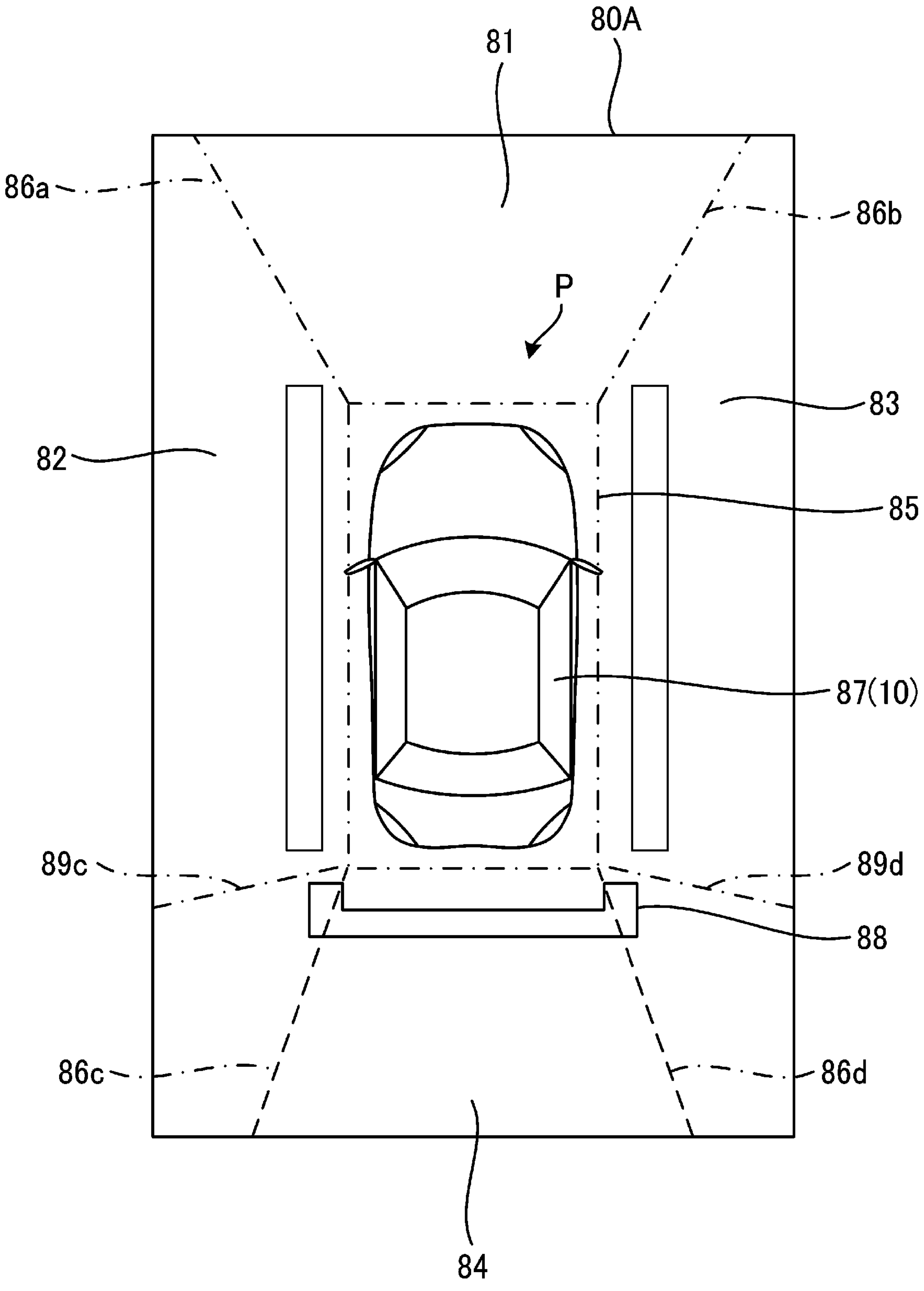
FIG. 10 is a diagram illustrating an example of a bird's-eye view image generated based on respective pieces of imaging data of a plurality of cameras according to a third embodiment.

FIG. 10 is a diagram illustrating an example of a bird's-eye view image generated using respective pieces of imaging data obtained by the front camera 12Fr, the rear camera 12Rr, the left lateral-side camera 12L, and the right lateral-side camera 12R of the vehicle 10. FIG. 11 is a diagram illustrating an example of a three-dimensional image generated using the same respective pieces of imaging data obtained by the cameras 12Fr, 12Rr. 12L, and 12R. FIG. 12 is a diagram illustrating an example of the bird's-eye view image and the three-dimensional image displayed on the touch screen 42 of the vehicle 10.

The third embodiment illustrates display control performed by the control ECU 20 in a case where the vehicle 10 is back-parked in the predetermined parking space P. As illustrated in FIGS. 10 and 11, a parking frame line 88 serving as a parking target position of the vehicle 10 is provided in the parking space P. Therefore, at the time of the back parking, an image of the parking frame line 88 with good visibility is required in order to enable accurate recognition of a positional relationship between the vehicle 10 (a vehicle image 87) and the parking frame line 88.

Therefore, for example, as shown in a bird's-eye view image 80A of FIG. 10, in a case where it is determined that the parking frame line 88 is displayed overlapping a boundary line 86*c* between the left lateral-side image 82 and the rear image 84 and a boundary line 86*d* between the right lateral-side image 83 and the rear image 84 when the vehicle 10 goes back, the control ECU 20 causes the image processor 57 to perform the synthesis processing of the respective pieces of imaging data again so that the parking frame line 88 and the boundary lines 86*c* and 86*d* do not overlap each other.

Figure 11:
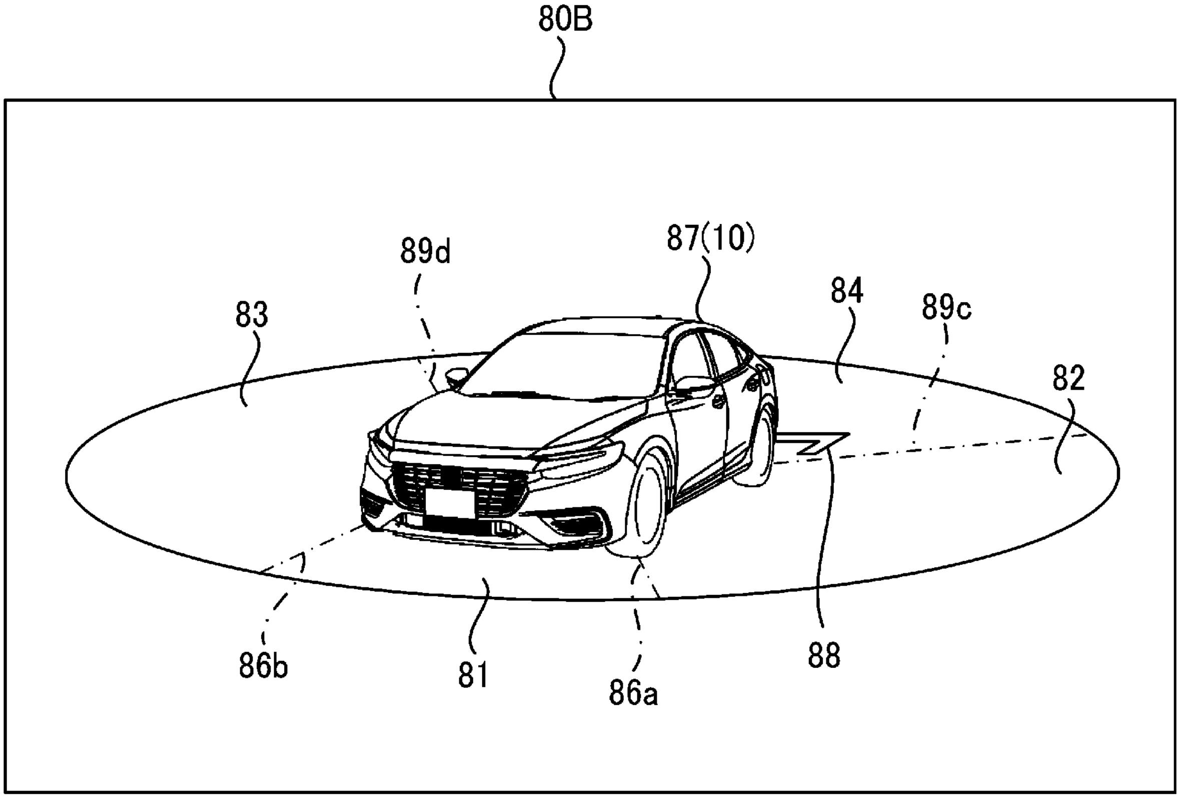
FIG. 11 is a diagram illustrating an example of a three-dimensional image generated based on respective pieces of imaging data of a plurality of cameras.
Figure 12:
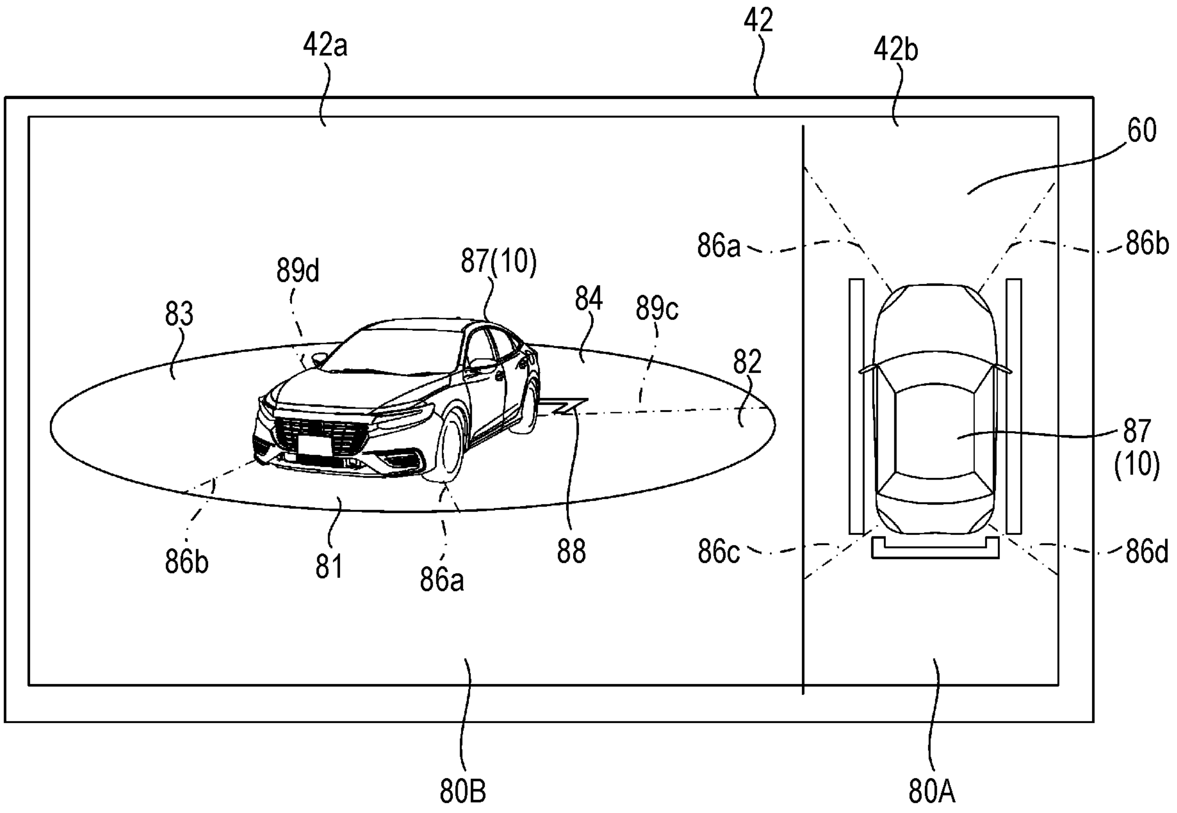
FIG. 12 is a diagram illustrating an example of a bird's-eye view image and a three-dimensional image displayed on a touch screen of a vehicle.

Then, the boundary lines 86*c* and 86*d* are changed to the boundary lines shifted to the lateral side not overlapping the parking frame line 88, like boundary lines 89*c* and 89*d* shown in the bird's-eye view image 80A of FIG. 10 and a three-dimensional image 80B of FIG. 11. With respect to the change of the boundary lines, the boundary lines in only the three-dimensional image 80B may be changed as in the first embodiment, or the boundary lines in the bird's-eye view image 80A may be further changed after the boundary lines in the three-dimensional image 80B is changed as in the second embodiment.

Accordingly, the touch screen 42 of the vehicle 10 displays images among which at least the three-dimensional image 80B does not have a boundary line overlapping the parking frame line 88, that is, the three-dimensional image 80B in which the parking frame line 88 having good visibility is displayed is displayed on the touch screen 42. In the first display area 42*a* and the second display area 42*b* of the touch screen 42 illustrated in FIG. 12, the three-dimensional image 80B and the bird's-eye view image 80A in which no boundary line overlaps the parking frame line 88 are displayed, respectively.

As described above, when the object presence/absence determination unit 56 determines that a predetermined object is present on the boundary line, the control ECU 20 causes the image processor 57 to preferentially change the boundary line in the three-dimensional image among the displayed bird's-eye view image and the three-dimensional image.

Note that preferentially changing the boundary line in the three-dimensional image among the bird's-eye view image and the three-dimensional image means preferentially changing the boundary line in the three-dimensional image unless there is any other factor to preferentially change the boundary line in the bird's-eye view image, such as the user designating to change the boundary line in the bird's-eye view image or the user frequently referring to the bird's-eye view image rather than the three-dimensional image.

Accordingly, when a predetermined object is present on the boundary line, the boundary line in the three-dimensional image, with which a surrounding situation is more easily recognized by the driver of the vehicle 10 than with the bird's-eye view image, is changed preferentially (namely, on a priority basis), and thus it is possible for the driver to quickly recognize the predetermined object. Therefore, for example, it is possible to accurately check whether the vehicle 10 collides with an obstacle in the surroundings while the vehicle 10 is entering a narrow parking space or coming out from a narrow parking space. In addition, while the vehicle 10 is entering the narrow parking space, it is easy to check whether there is a space for allowing the occupant of the vehicle 10 to easily get off the vehicle 10 after the vehicle 10 is stopped. In addition, while the vehicle 10 is stopping, it is easy to check whether there is an obstacle that the occupant of the vehicle 10 comes into contact with at the time of getting off the vehicle 10.

When the object presence/absence determination unit 56 determines that a predetermined object is present on the boundary line, the control ECU 20 causes the image processor 57 to change the boundary line in only the three-dimensional image among the bird's-eye view image and the three-dimensional image. For this reason, at least the boundary line in the three-dimensional image with which the surrounding situation is easily recognized is changed, and thus it is possible to rapidly recognize the predetermined object.

When the object presence/absence determination unit 56 determines that a predetermined object is present on the boundary line, the control ECU 20 causes the image processor 57 to change the boundary line in the three-dimensional image and displays the changed three-dimensional image on the touch screen 42, and then changes the boundary line in the bird's-eye view image and displays the changed bird's-eye view image on the touch screen 42. Accordingly, it is possible to quickly recognize the predetermined object through the three-dimensional image, and it is possible to check the object in images having good visibility through the bird's eye view image as well, and thus the convenience is improved.

Although a case is described in the embodiment described above where when it is determined that a predetermined object is displayed overlapping the boundary line, the boundary line in the three-dimensional image among the bird's-eye view image and the three-dimensional image is always preferentially changed, the present disclosure is not limited thereto. For example, the control ECU 20 may preferentially change the boundary line in one of the bird's-eye view image and the three-dimensional image based on information related to the user of the vehicle 10 (for example, the driver of the vehicle 10).

The information related to the user is, for example, a setting by the user. That is, when the user of the vehicle 10 (for example, the driver of the vehicle 10) sets that the boundary line in the bird's-eye view image among the bird's-eye view image and the three-dimensional image should be preferentially changed, the control ECU 20 may preferentially change the boundary line in the bird's-eye view image among the bird's-eye view image and the three-dimensional image. Accordingly, it is possible to improve the usability of the present function in the vehicle 10.

Alternatively, the information related to the user may be history information of the user referring to each of the bird's-eye view image and the three-dimensional image in the past. For example, the control ECU 20 may determine which image of the bird's-eye view image and the three-dimensional image the driver of the vehicle 10 more frequently refers to, based on the history information of the user referring to each of the bird's-eye view image and the three-dimensional image in the past, and may preferentially change the boundary line in the image that is more frequently referred to. Accordingly, it is possible to improve the usability of the present function in the vehicle 10.

The history information of the user referring to each of the bird's-eye view image and the three-dimensional image in the past is obtained, for example, based on a detection result by a line-of-sight sensor that is provided in the vehicle 10 and that detects a line of sight of the driver of the vehicle 10. In addition, in a case where any one of the bird's-eye view image and the three-dimensional image can be displayed on the touch screen 42 according to an operation of the driver, the history information of the user referring to each of the bird's-eye view image and the three-dimensional image in the past may be obtained based on a switching history of display of the bird's-eye view image and the three-dimensional image that is operated by the driver.

Although the three-dimensional image and the bird's-eye view image displayed at the time of selecting a parking frame or at the time of parking the vehicle 10 have been described, the present disclosure is not limited thereto, and can be applied to the three-dimensional image and the bird's-eye view image displayed at the time of starting to move the vehicle 10.

Although the embodiment of the present disclosure has been described above, the present disclosure is not limited to the above-described embodiment, and modifications, improvements, and the like can be made as appropriate.

For example, although a case where the control ECU 20 displays the bird's-eye view image and the three-dimensional image on the touch screen 42 of the vehicle 10 has been described in the above-described embodiment, the present disclosure is not limited thereto. For example, the control ECU 20 may display the bird's-eye view image and the three-dimensional image on a display screen of an information terminal (for example, a smartphone) possessed by the occupant of the vehicle 10 via the communication unit 24.

Although an example in which the moving body is a vehicle is described in the above-described embodiment, the present disclosure is not limited thereto. The concept of the present disclosure can be applied not only to a vehicle but also to a robot, a boat, an aircraft, and the like that are provided with a driving source and movable by power of the driving source.

The control method described in the above embodiment can be implemented by executing a control program prepared in advance on a computer. The control program is recorded in a non-transitory computer-readable storage medium and is executed by being read from the storage medium. The control program may be provided in a form stored in a non-transitory storage medium such as a flash memory, or may be provided via a network such as the Internet. The computer that executes the control program may be provided in a control device, may be provided in an electronic device such as a smartphone, a tablet terminal, or a personal computer capable of communicating with the control device, or may be provided in a server device capable of communicating with the control device and the electronic device.

In the present specification, at least the following matters are described. Although the corresponding components or the like in the above-described embodiment are shown in parentheses, the present disclosure is not limited thereto.

(1) A control device, including: an image processor (image processor 57) that generates a bird's-eye view image and a three-dimensional image that show a moving body (vehicle 10) and surroundings of the moving body, based on respective pieces of imaging data obtained by a plurality of imaging devices (front camera 12Fr, rear camera 12Rr, left lateral-side camera 12L, and right lateral-side camera 12R) of the moving body;

a display controller (display controller 55) that causes a display device (touch screen 42) to display the bird's-eye view image and the three-dimensional image generated by the image processor; and a determination unit (object presence/absence determination unit 56) that determines whether a predetermined object (obstacle 68, parking frame line 88) is present in a boundary region between the respective pieces of imaging data in the bird's-eye view image and the three-dimensional image, in which when the determination unit determines that the predetermined object is present in the boundary region, the image processor preferentially changes the boundary region in the three-dimensional image among the bird's-eye view image and the three-dimensional image to be displayed.

According to (1), when the predetermined object is present in the boundary region, the boundary region in the three-dimensional image with which a surrounding situation is more easily recognized by a user is preferentially changed, so that the predetermined object can be quickly recognized by a driver.

(2) The control device according to (1), in which when the determination unit determines that the predetermined object is present in the boundary region, the image processor changes the boundary region in only the three-dimensional image among the bird's-eye view image and the three-dimensional image.

According to (2), since at least the boundary region in the three-dimensional image with which the surrounding situation is easily recognized is changed, it is possible to recognize the predetermined object quickly.

(3) The control device according to (1), in which when the determination unit determines that the predetermined object is present in the boundary region, the image processor changes the boundary region in the three-dimensional image and output the changed three-dimensional image to the display controller, and then changes the boundary region in the bird's-eye view image and outputs the changed bird's-eye view image to the display controller.

According to (3), it is possible to quickly recognize the predetermined object through the three-dimensional image, and it is possible to check the predetermined object in images having good visibility through the bird's-eye view image, and thus the convenience is improved.

(4) The control device according to any one of (1) to (3), in which when the determination unit determines that the predetermined object is present in the boundary region, the image processor preferentially changes the boundary region in one of the bird's-eye view image and the three-dimensional image based on information related to a user of the moving body.

According to (4), it is possible to improve usability by preferentially changing the boundary region in an image corresponding to the information related to the user among the bird's-eye view image and the three-dimensional image.

(5) The control device according to (4), in which the information related to a user of the moving body includes information of history of the user referring to each of the bird's-eye view image and the three-dimensional image in the past.

According to (5), it is possible to improve the usability by preferentially changing the boundary region in an image that the user refers more frequently among the bird's-eye view image and the three-dimensional image.

(6) A control method to be executed by a processor, the processor being configured to generate a bird's-eye view image and a three-dimensional image that show a moving body and surroundings of the moving body based on respective pieces of imaging data obtained by a plurality of imaging devices of the moving body, and display the generated bird's-eye view image and the generated three-dimensional image on a display device, the control method including:

the processor determining whether a predetermined object is present in a boundary region between the respective pieces of imaging data in the bird's-eye view image and the three-dimensional image; and when it is determined that the predetermined object is present in the boundary region, the processor preferentially changing the boundary region in the three-dimensional image among the bird's-eye view image and the three-dimensional image to be displayed.

According to (6), when the predetermined object is present in the boundary region, the boundary region in the three-dimensional image with which a surrounding situation is more easily recognized by a user is preferentially changed, so that the predetermined object can be quickly recognized by a driver.

(7) A control program for causing a processor to perform processing, the processor being configured to generate a bird's-eye view image and a three-dimensional image that show a moving body and surroundings of the moving body based on respective pieces of imaging data obtained by a plurality of imaging devices of the moving body, and to display the generated bird's-eye view image and the generated three-dimensional image on a display device, the processing including:

determining whether a predetermined object is present in a boundary region between the respective pieces of imaging data in the bird's-eye view image and the three-dimensional image; and when it is determined that the predetermined object is present in the boundary region, preferentially changing the boundary region in the three-dimensional image among the bird's-eye view image and the three-dimensional image to be displayed.

According to (7), when the predetermined object is present in the boundary region, the boundary region in the three-dimensional image with which a surrounding situation is more easily recognized by a user is preferentially changed, so that the predetermined object can be quickly recognized by a driver.

The invention claimed is:

1. A control device, comprising:

circuitry configured to:

generate a bird's-eye view image and a three-dimensional image that show a moving body and surroundings of the moving body, based on respective pieces of imaging data obtained by a plurality of imaging devices of the moving body;

cause a display device to display the generated bird's-eye view image and the generated three-dimensional image; and determine whether a predetermined object is present in a boundary region between the respective pieces of imaging data in the bird's-eye view image and the three-dimensional image, wherein upon determining that the predetermined object is present in the boundary region, the circuitry is configured to preferentially change the boundary region in the three-dimensional image among the displayed bird's-eye view image and the displayed three-dimensional image, and upon determining that the predetermined object is present in the boundary region, the circuitry is configured to change the boundary region in one of the bird's-eye view image and the three-dimensional image based on information related to a user of the moving body.

2. The control device according to claim 1, wherein upon determining that the predetermined object is present in the boundary region, the circuitry is configured to change the boundary region in only the displayed three-dimensional image among the bird's-eye view image and three-dimensional image.

3. The control device according to claim 1, wherein upon determining that the predetermined object is present in the boundary region, the circuitry is configured to change the boundary region in the three-dimensional image and output to display the changed three-dimensional image, and change the boundary region in the bird's-eye view image and output to display the changed bird's-eye view image.

4. The control device according to claim 1, wherein the information related to the user of the moving body includes information of history of the user referring to each of the bird's-eye view image and the three-dimensional image in the past.

5. A control method executed by a processor, wherein the processor is configured to generate a bird's-eye view image and a three-dimensional image that show a moving body and surroundings of the moving body based on respective pieces of imaging data obtained by a plurality of imaging devices of the moving body, and display the generated bird's-eye view image and the generated three-dimensional image on a display device, and the control method comprises:

the processor determining whether a predetermined object is present in a boundary region between the respective pieces of imaging data in the bird's-eye view image and the three-dimensional image;

upon determining that the predetermined object is present in the boundary region, the processor preferentially changing the boundary region in the three-dimensional image among the displayed bird's-eye view image and the displayed three-dimensional image; and upon determining that the predetermined object is present in the boundary region, the processor changes the boundary region in one of the bird's-eye view image and the three-dimensional image based on information related to a user of the moving body.

6. A non-transitory computer-readable storage medium storing a control program for causing a processor to perform processing, wherein the processor is configured to generate a bird's-eye view image and a three-dimensional image that show a moving body and surroundings of the moving body based on respective pieces of imaging data obtained by a plurality of imaging devices of the moving body, and to display the generated bird's-eye view image and the generated three-dimensional image on a display device, and the processing comprises:

determining whether a predetermined object is present in a boundary region between the respective pieces of imaging data in the bird's-eye view image and the three-dimensional image;

when it is determined that the predetermined object is present in the boundary region, preferentially changing the boundary region in the three-dimensional image among the displayed bird's-eye view image and the displayed three-dimensional image; and when it is determined that that the predetermined object is present in the boundary region, changing the boundary region in one of the bird's-eye view image and the three-dimensional image based on information related to a user of the moving body.

* * * * *